(12) United States Patent
Bass et al.

(10) Patent No.: US 6,649,348 B2
(45) Date of Patent: Nov. 18, 2003

(54) METHODS FOR MANUFACTURING ARRAYS (75) Inventors: Jay K. Bass, Mountain View, CA (US); John F. McEntee, Boulder Creek, CA (US); Tim J. Lazaruk, Redwood City, CA (US); Maryam Mobed-Miremadi, Sunnyvale, CA (US)

(73) Assignee: Agilent Technologies Inc., Palo Alto, CA (US)

( * ) Notice: Subject to any disclaimer, the term of this patent is extended or adjusted under 35 U.S.C. 154(b) by 32 days.

(21) Appl. No.: 09/896,572

(22) Filed: Jun. 29, 2001

(65) Prior Publication Data

US 2003/0003222 A1 Jan. 2, 2003

(51) Int. Cl.[7] ............ C12Q 1/68; C12N 11/16; C07H 21/04; C07K 5/00; C12M 1/36
(52) U.S. Cl. ............ 435/6; 435/7.1; 435/174; 435/283.1; 435/287.2; 435/288.5; 536/23.1; 536/24.3; 536/25.3; 536/25.31; 530/333; 530/334; 530/335
(58) Field of Search ............ 536/25.3, 23.1, 536/24.3, 25.31; 422/68.1; 435/7.1, 174, 6, 283.1, 287.2, 288.5; 530/333, 334, 335

(56) References Cited

U.S. PATENT DOCUMENTS

| | | | | |
|---|---|---|---|---|
| 4,294,800 A | * | 10/1981 | Tavlarides et al. ............ 422/68 |
| 5,288,514 A | * | 2/1994 | Ellman ............ 427/2 |
| 5,958,760 A | | 9/1999 | Freeman ............ 435/286.5 |
| 6,057,100 A | * | 5/2000 | Heyneker ............ 435/6 |
| 6,114,122 A | | 9/2000 | Besemer et al. ............ 435/6 |
| 6,150,147 A | | 11/2000 | Goldberg et al. ............ 435/173.1 |
| 6,165,778 A | * | 12/2000 | Kedar ............ 435/289.1 |
| 6,384,210 B1 | * | 5/2002 | Blanchard ............ 536/25.3 |
| 6,440,669 B1 | * | 8/2002 | Bass et al. ............ 435/6 |
| 2002/0111741 A1 | * | 8/2002 | Abraham-Fuchs et al. ............ 702/19 |

FOREIGN PATENT DOCUMENTS

WO    WO 98/41531    *   9/1998

\* cited by examiner

*Primary Examiner*—B. J. Forman (57) ABSTRACT

Apparatus and methods are disclosed for synthesizing a plurality of compounds on the surface of supports. Biopolymer features are attached to the surfaces of the supports. The synthesis generally comprises a plurality of steps. In the present invention at least two of the steps are performed by placing a support having a functionalized surface into a chamber of a flow cell and subjecting the surface to a step of the synthesis and placing the support into a chamber of another flow cell and subjecting the surface to another step of the synthesis. An apparatus generally comprises a plurality of flow cells and one or more fluid dispensing stations are mounted on the platform and are in fluid communication with one or more of the plurality of flow cells. A station for monomer addition to the surface of the support is mounted on the platform. The apparatus further comprises a mechanism for moving a support to and from the station for monomer addition and a flow cell and from one flow cell to another flow cell.

29 Claims, 2 Drawing Sheets

METHODS FOR MANUFACTURING ARRAYS

BACKGROUND OF THE INVENTION

This invention relates to the manufacturing of supports having bound to the surfaces thereof a plurality of chemical compounds such as polymers, which are prepared on the surface in a series of steps. More particularly, the present invention relates to methods for solid phase chemical synthesis, particularly solid phase synthesis of oligomer arrays, or attachment of oligonucleotides and polynucleotides to surfaces, e.g., arrays of polynucleotides.

In the field of diagnostics and therapeutics, it is often useful to attach species to a surface. One important application is in solid phase chemical synthesis wherein initial derivatization of a substrate surface enables synthesis of polymers such as oligonucleotides and peptides on the substrate itself. Support bound oligomer arrays, particularly oligonucleotide arrays, may be used in screening studies for determination of binding affinity. Modification of surfaces for use in chemical synthesis has been described. See, for example, U.S. Pat. No. 5,624,711 (Sundberg), U.S. Pat. No. 5,266,222 (Willis) and U.S. Pat. No. 5,137,765 (Farnsworth).

Determining the nucleotide sequences and expression levels of nucleic acids (DNA and RNA) is critical to understanding the function and control of genes and their relationship, for example, to disease discovery and disease management. Analysis of genetic information plays a crucial role in biological experimentation. This has become especially true with regard to studies directed at understanding the fundamental genetic and environmental factors associated with disease and the effects of potential therapeutic agents on the cell. Such a determination permits the early detection of infectious organisms such as bacteria, viruses, etc.; genetic diseases such as sickle cell anemia; and various cancers. This paradigm shift has lead to an increasing need within the life science industries for more sensitive, more accurate and higher-throughput technologies for performing analysis on genetic material obtained from a variety of biological sources.

Unique or misexpressed nucleotide sequences in a polynucleotide can be detected by hybridization with a nucleotide multimer, or oligonucleotide, probe. Hybridization is based on complementary base pairing. When complementary single stranded nucleic acids are incubated together, the complementary base sequences pair to form double stranded hybrid molecules. These techniques rely upon the inherent ability of nucleic acids to form duplexes via hydrogen bonding according to Watson-Crick base-pairing rules. The ability of single stranded deoxyribonucleic acid (ssDNA) or ribonucleic acid (RNA) to form a hydrogen bonded structure with a complementary nucleic acid sequence has been employed as an analytical tool in molecular biology research. An oligonucleotide probe employed in the detection is selected with a nucleotide sequence complementary, usually exactly complementary, to the nucleotide sequence in the target nucleic acid. Following hybridization of the probe with the target nucleic acid, any oligonucleotide probe/nucleic acid hybrids that have formed are typically separated from unhybridized probe. The amount of oligonucleotide probe in either of the two separated media is then tested to provide a qualitative or quantitative measurement of the amount of target nucleic acid originally present.

Direct detection of labeled target nucleic acid hybridized to surface-bound polynucleotide probes is particularly advantageous if the surface contains a mosaic of different probes that are individually localized to discrete, known areas of the surface. Such ordered arrays containing a large number of oligonucleotide probes have been developed as tools for high throughput analyses of genotype and gene expression. Oligonucleotides synthesized on a solid support recognize uniquely complementary nucleic acids by hybridization, and arrays can be designed to define specific target sequences, analyze gene expression patterns or identify specific allelic variations. The arrays may be used for conducting cell study, for diagnosing disease, identifying gene expression, monitoring drug response, determination of viral load, identifying genetic polymorphisms, analyze gene expression patterns or identify specific allelic variations, and the like.

In one approach, cell matter is lysed, to release its DNA as fragments, which are then separated out by electrophoresis or other means, and then tagged with a fluorescent or other label. The resulting DNA mix is exposed to an array of oligonucleotide probes, whereupon selective binding to matching probe sites takes place. The array is then washed and interrogated to determine the extent of hybridization reactions. In one approach the array is imaged so as to reveal for analysis and interpretation the sites where binding has occurred. Arrays of different chemical probe species provide methods of highly parallel detection, and hence improved speed and efficiency, in assays. Assuming that the different sequence polynucleotides were correctly deposited in accordance with the predetermined configuration, then the observed binding pattern will be indicative of the presence and/or concentration of one or more polynucleotide components of the sample.

The arrays may be microarrays created by in-situ synthesis, oligonucleotide deposition or cDNA. In general, arrays are synthesized on a surface of a substrate by one of any number of synthetic techniques that are known in the art. In one approach to the synthesis of microarrays flow cells or flow devices are employed in which a substrate is placed to carry out the synthesis.

SUMMARY OF THE INVENTION

One embodiment of the present invention is a method for synthesizing a plurality of chemical compounds on the surface of a support wherein the synthesis comprises a plurality of steps. The method comprises performing at least two of the steps by placing a support having a functionalized surface into a chamber of one flow cell, arbitrarily designated as a first flow cell, and subjecting the surface to a step, arbitrarily designated as a first step, of the synthesis and placing the support into a chamber of another flow cell, arbitrarily designated as a second flow cell, and subjecting the surface to another step, arbitrarily designated as a second step, of the synthesis.

Another embodiment of the present invention is a method for synthesizing a plurality of biopolymers on the surface of a support wherein the synthesis comprises a plurality of monomer additions. Each of the following steps is performed after each of the monomer additions. As above, the designations of first and second is arbitrarily applied to the flow cells and the steps involved. The support is placed into a chamber of a first flow cell and the surface thereof is subjected to a first step of the synthesis that is subsequent to a monomer addition. Then, the support is placed into a chamber of a second flow cell and the surface thereof is subjected to a second step of the synthesis that is subsequent to the first step. The steps are usually repetitive steps such as, for example, washing the surface of the surface, oxidizing substances on the surface of the support, removing protective groups from the surface of the support, and so forth.

Another embodiment of the present invention is an apparatus for synthesizing an array of biopolymers on the surface of a support. The apparatus comprises a plurality of flow cells. One or more fluid dispensing stations are in fluid communication with one or more of the plurality of flow cells. A station is included for monomer addition to the surface of the support. The apparatus further comprises a mechanism for moving a support to and from the station for monomer addition and a flow cell and from one flow cell to another flow cell.

Another embodiment of the present invention is an apparatus for synthesizing an array of biopolymers on the surface of a support. The apparatus comprises a plurality of flow cells, which may be mounted on the platform or other suitable frame. The flow cells comprise a chamber, a holder for the support, at least one inlet and an outlet, wherein each of the inlets is in fluid communication with a manifold. The outlet is in controlled fluid communication with one or more purification systems, holding chambers and sensors. One or more fluid dispensing stations are mounted on the platform and are in fluid communication with one or more of the plurality of flow cells by means of the manifolds. A station for monomer addition to the surface of the support is mounted on the platform. The apparatus also comprises a mechanism for moving a support to and from the station for monomer addition and a flow cell and from one flow cell to another flow cell. Also included is a controller for controlling the movement of the mechanism.

DETAILED DESCRIPTION OF THE INVENTION

The present methods and apparatus may be employed in the synthesis of a plurality of chemical compounds on supports with particular application to such synthesis on a commercial scale. Usually, the chemical compounds are those which are synthesized in a series of steps such as, for example, the addition of building blocks, which are chemical components of the chemical compound. Examples of such building blocks are those found in the synthesis of polymers. The apparatus and methods of the invention employ a plurality of dedicated flow cells, in each of which a different repetitive step in the synthesis of the chemical compounds is conducted. In this way a substantial reduction in cross-contamination is realized and system design is simplified. In one aspect of the invention fluid materials, such as fluid reagents and wash fluids, exiting the flow cell are subjected to examination and/or purification in-line. A determination is made in-line to send the resulting fluid materials to be combined with fresh materials for input into the flow cell or to be sent to a waste container.

As mentioned above, the chemical compounds are those that are synthesized in a series of steps, which usually involve linking together building blocks that form the chemical compound. The invention has particular application to the synthesis of oligomers or polymers. The oligomer or polymer is a chemical entity that contains a plurality of monomers. It is generally accepted that the term "oligomers" is used to refer to a species of polymers. The terms "oligomer" and "polymer" may be used interchangeably herein. Polymers usually comprise at least two monomers. Oligomers generally comprise about 6 to about 20,000 monomers, preferably, about 10 to about 10,000, more preferably about 15 to about 4,000 monomers. Examples of polymers include polydeoxyribonucleotides, polyribonucleotides, other polynucleotides that are C-glycosides of a purine or pyrimidine base, or other modified polynucleotides, polypeptides, polysaccharides, and other chemical entities that contain repeating units of like chemical structure. Exemplary of oligomers are oligonucleotides and peptides.

A monomer is a chemical entity that can be covalently linked to one or more other such entities to form an oligomer or polymer. Examples of monomers include nucleotides, amino acids, saccharides, peptoids, and the like. In general, the monomers have first and second sites (e.g., C-termini and N-termini, or 5' and 3' sites) suitable for binding of other like monomers by means of standard chemical reactions (e.g., condensation, nucleophilic displacement of a leaving group, or the like), and a diverse element that distinguishes a particular monomer from a different monomer of the same type (e.g., an amino acid side chain, a nucleotide base, etc.). The initial substrate-bound monomer is generally used as a building block in a multi-step synthesis procedure to form a complete ligand, such as in the synthesis of oligonucleotides, oligopeptides, oligosaccharides, etc. and the like.

Polynucleotides are compounds or compositions that are polymeric nucleotides or nucleic acid polymers. The polynucleotide may be a natural compound or a synthetic compound. Polynucleotides include oligonucleotides and are comprised of natural nucleotides such as ribonucleotides and deoxyribonucleotides and their derivatives although unnatural nucleotide mimetics such as 2'-modified nucleosides, peptide nucleic acids and oligomeric nucleoside phosphonates are also used. The polynucleotide can have from about 2 to 5,000,000 or more nucleotides. Usually, the oligonucleotides are at least about 2 nucleotides, preferably, about 5 to about 100 nucleotides, more preferably, about 10 to about 50 nucleotides, and usually, about 15 to about 30 nucleotides, in length.

The support to which a plurality of chemical compounds is attached is usually a porous or non-porous water insoluble material. The support can have any one of a number of shapes, such as strip, plate, disk, rod, particle, and the like. The support can be hydrophilic or capable of being rendered hydrophilic or it may be hydrophobic. The support is usually glass such as flat glass whose surface has been chemically activated to support binding or synthesis thereon, glass available as Bioglass and the like. However, the support may be made from materials such as inorganic powders, e.g., silica, magnesium sulfate, and alumina; natural polymeric materials, particularly cellulosic materials and materials derived from cellulose, such as fiber containing papers, e.g., filter paper, chromatographic paper, etc.; synthetic or modified naturally occurring polymers, such as nitrocellulose, cellulose acetate, poly (vinyl chloride), polyacrylamide, cross linked dextran, agarose, polyacrylate, polyethylene, polypropylene, poly(4-methylbutene), polystyrene, polymethacrylate, poly(ethylene terephthalate), nylon, poly (vinyl butyrate), etc.; either used by themselves or in conjunction with other materials; ceramics, metals, and the like. Preferably, for packaged arrays the support is a non-porous material such as glass, plastic, metal and the like.

The surface of a support is normally treated to create a primed or functionalized surface, that is, a surface that is able to support the synthetic steps involved in the production of the chemical compound. Functionalization relates to modification of the surface of a support to provide a plurality of functional groups on the support surface. By the term "functionalized surface" is meant a support surface that has been modified so that a plurality of functional groups are present thereon. The manner of treatment is dependent on the nature of the chemical compound to be synthesized and on the nature of the support surface. In one approach a reactive hydrophilic site or reactive hydrophilic group is introduced onto the surface of the support. Such hydrophilic moieties can be used as the starting point in a synthetic organic process.

In one embodiment, the surface of the support, such as a glass support, is siliceous, i.e., comprises silicon oxide groups, either present in the natural state, e.g., glass, silica, silicon with an oxide layer, etc., or introduced by techniques well known in the art. One technique for introducing siloxyl groups onto the surface involves reactive hydrophilic moieties on the surface. These moieties are typically epoxide groups, carboxyl groups, thiol groups, and/or substituted or unsubstituted amino groups as well as a functionality that may be used to introduce such a group such as, for example, an olefin that may be converted to a hydroxyl group by means well known in the art. One approach is disclosed in U.S. Pat. No. 5,474,796 (Brennan), the relevant portions of which are incorporated herein by reference. A siliceous surface may be used to form silyl linkages, i.e., linkages that involve silicon atoms. Usually, the silyl linkage involves a silicon-oxygen bond, a silicon-halogen bond, a silicon-nitrogen bond, or a silicon-carbon bond.

A procedure for the derivatization of a metal oxide surface uses an aminoalkyl silane derivative, e.g., trialkoxy 3-aminopropylsilane such as aminopropyltriethoxy silane (APS), 4-aminobutyltrimethoxysilane, 4-aminobutyltriethoxysilane, 2-aminoethyltriethoxysilane, and the like. APS reacts readily with the oxide and/or siloxyl groups on metal and silicon surfaces. APS provides primary amine groups that may be used to carry out the present methods. Such a derivatization procedure is described in EP 0 173 356 B1, the relevant portions of which are incorporated herein by reference. Other methods for treating the surface of a support will be suggested to those skilled in the art in view of the teaching herein.

The apparatus and methods of the present invention are particularly useful in the synthesis of arrays of biopolymers. A biopolymer is a polymer of one or more types of repeating units relating to biology. Biopolymers are typically found in biological systems (although they may be made synthetically) and particularly include polysaccharides such as carbohydrates and the like, poly(amino acids) such as peptides including polypeptides and proteins, and polynucleotides, as well as such compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions.

An array includes any one, two or three dimensional arrangement of addressable regions bearing a particular chemical moiety or moieties such as, for example, biopolymers, e.g., one or more polynucleotides, associated with that region. An array is addressable in that it has multiple regions of different moieties, for example, different polynucleotide sequences, such that a region or feature or spot of the array at a particular predetermined location or address on the array can detect a particular target molecule or class of target molecules although a feature may incidentally detect non-target molecules of that feature.

The present methods and apparatus may be used in the synthesis of polypeptides. The synthesis of polypeptides involves the sequential addition of amino acids to a growing peptide chain. This approach comprises attaching an amino acid to the functionalized surface of the support. In one approach the synthesis involves sequential addition of carboxyl-protected amino acids to a growing peptide chain with each additional amino acid in the sequence similarly protected and coupled to the terminal amino acid of the oligopeptide under conditions suitable for forming an amide linkage. Such conditions are well known to the skilled artisan. See, for example, Merrifield, B. (1986), Solid Phase Synthesis, *Sciences* 232, 341–347. After polypeptide synthesis is complete, acid is used to remove the remaining terminal protecting groups. In accordance with the present invention each of certain repetitive steps involved in the addition of an amino acid is carried out in a different flow cell that is dedicated to that repetitive step. Such repetitive steps may involve, among others, washing of the surface, protection and deprotection of certain functionalities on the surface, oxidation or reduction of functionalities on the surface, and so forth.

The apparatus and methods of the present invention are particularly useful in the synthesis of oligonucleotide arrays for determinations of polynucleotides. In the field of bioscience, arrays of oligonucleotide probes, fabricated or deposited on a surface of a support, are used to identify DNA sequences in cell matter. The arrays generally involve a surface containing a mosaic of different oligonucleotides or sample nucleic acid sequences or polynucleotides that are individually localized to discrete, known areas of the surface. In one approach, multiple identical arrays across a complete front surface of a single substrate or support are used. However, the arrays produced on a given substrate need not be identical and some or all could be different. Each array may contain multiple spots or features and each array may be separated by spaces. Each feature, or element, within the molecular array is defined to be a small, regularly shaped region of the surface of the substrate. The features are arranged in a regular pattern. Each feature within the molecular array may contain a different molecular species, and the molecular species within a given feature may differ from the molecular species within the remaining features of the molecular array. A typical array may contain from about 100 to about 100,000 or more features. All of the features may be different, or some or all may be the same. Each feature may carry a predetermined polynucleotide having a particular sequence or a predetermined mixture of polynucleotides. While arrays may be separated from one another by spaces, and the features may be separated from one another by spaces, such spaces in either instance are not essential.

Ordered arrays containing a large number of oligonucleotides have been developed as tools for high throughput analyses of genotype and gene expression. Oligonucleotides synthesized on a solid support recognize uniquely complementary nucleic acids by hybridization, and arrays can be designed to define specific target sequences, analyze gene expression patterns or identify specific allelic variations.

The arrays may be used for conducting cell study, for diagnosing disease, identifying gene expression, monitoring drug response, determination of viral load, identifying genetic polymorphisms, analyze gene expression patterns or identify specific allelic variations, and the like.

The synthesis of arrays of polynucleotides on the surface of a support usually involves attaching an initial nucleoside or nucleotide to a functionalized surface. The surface may be functionalized as discussed above. In one approach the surface is reacted with nucleosides or nucleotides that are also functionalized for reaction with the groups on the surface of the support. Methods for introducing appropriate amine specific or alcohol specific reactive functional groups into a nucleoside or nucleotide include, by way of example, addition of a spacer amine containing phosphoramidites, addition on the base of alkynes or alkenes using palladium mediated coupling, addition of spacer amine containing activated carbonyl esters, addition of boron conjugates, formation of Schiff bases.

After the introduction of the nucleoside or nucleotide onto the surface, the attached nucleotide may be used to construct the polynucleotide by means well known in the art. For example, in the synthesis of arrays of oligonucleotides, nucleoside monomers are generally employed. In this embodiment an array of the above compounds is attached to the surface and each compound is reacted to attach a nucleoside. Nucleoside monomers are used to form the polynucleotides usually by phosphate coupling, either direct phosphate coupling or coupling using a phosphate precursor such as a phosphite coupling. Such coupling thus includes the use of amidite (phosphoramidite), phosphodiester, phosphotriester, H-phosphonate, phosphite halide, and the like coupling.

One preferred coupling method is phosphoramidite coupling, which is a phosphite coupling. In using this coupling method, after the phosphite coupling is complete, the resulting phosphite is oxidized to a phosphate. Oxidation can be effected with iodine to give phosphates or with sulfur to give phosphorothioates. The phosphoramidites are dissolved in anhydrous acetonitrile to give a solution having a given ratio of amidite concentrations. The mixture of known chemically compatible monomers is reacted to a solid support, or further along, may be reacted to a growing chain of monomer units. In one particular example, the terminal 5'-hydroxyl group is caused to react with a deoxyribonucleoside-3'-O-(N,N-diisopropylamino) phosphoramidite protected at the 5'-position with dimethoxytrityl or the like. The 5' protecting group is removed after the coupling reaction, and the procedure is repeated with additional protected nucleotides until synthesis of the desired polynucleotide is complete. For a more detailed discussion of the chemistry involved in the above synthetic approaches, see, for example, U.S. Pat. No. 5,436,327 at column 2, line 34, to column 4, line 36, which is incorporated herein by reference in its entirety.

Various ways may be employed to introduce the reagents for producing an array of polynucleotides on the surface of a support such as a glass support. Such methods are known in the art. One such method is discussed in U.S. Pat. No. 5,744,305 (Fodor, et al.) and involves solid phase chemistry, photolabile protecting groups and photolithography. Binary masking techniques are employed in one embodiment of the above. Arrays are fabricated in situ, adding one base pair at a time to a primer site. Photolithography is used to uncover sites, which are then exposed and reacted with one of the four base pair phosphoramidites. In photolithography the surface is first coated with a light-sensitive resist, exposed through a mask and the pattern is revealed by dissolving away the exposed or the unexposed resist and, subsequently, a surface layer. A separate mask is usually made for each pattern, which may involve four patterns for each base pair in the length of the probe.

Another in situ method employs inkjet printing technology to dispense the appropriate phosphoramidite reagents and other reagents onto individual sites on a surface of a support. Oligonucleotides are synthesized on a surface of a substrate in situ using phosphoramidite chemistry. Solutions containing nucleotide monomers and other reagents as necessary such as an activator, e.g., tetrazole, are applied to the surface of a support by means of thermal ink-jet technology. Individual droplets of reagents are applied to reactive areas on the surface using, for example, a thermal inkjet type nozzle. The surface of the support may have an alkyl bromide trichlorosilane coating to which is attached polyethylene glycol to provide terminal hydroxyl groups. These hydroxyl groups provide for linking to a terminal primary amine group on a monomeric reagent. Excess of non-reacted chemical on the surface is washed away in a subsequent step. For example, see U.S. Pat. No. 5,700,637 and PCT WO 95/25116 and PCT application WO 89/10977.

Other methods for synthesizing arrays of oligonucleotide on a surface include those disclosed by Gamble, et al., WO97/44134; Gamble, et al., WO98/10858; Baldeschwieler, et al., WO95/25116; Brown, et al., U.S. Pat. No. 5,807,522; and the like.

In general, in the above synthetic steps involving monomer addition such as, for example, the phosphoramidite method, there are certain repetitive steps such as washing the surface of the support prior to or after a reaction, oxidation of substances such as oxidation of a phosphite group to a phosphate group, removal of protecting groups, blocking of sites to prevent reaction at such site, capping of sites that did not react with a phosphoramidite reagent, deblocking, and so forth. In addition, under certain circumstances other reactions may be carried out in a flow cell such as, for example, phosphoramidite monomer addition, modified phosphoramidite addition, other monomer additions, addition of a polymer chain to a surface for linking to monomers, and so forth.

For in situ fabrication methods, multiple different reagent droplets are deposited by pulse jet or other means at a given target location in order to form the final feature (hence a probe of the feature is synthesized on the array substrate). The in situ fabrication methods include those described in U.S. Pat. No. 5,449,754 for synthesizing peptide arrays, and in U.S. Pat. No. 6,180,351 and WO 98/41531 and the references cited therein for polynucleotides, and may also use pulse jets for depositing reagents. The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence can be considered as multiple ones of the following attachment cycle at each feature to be formed: (a) coupling an activated selected nucleoside (a monomeric unit) through a phosphite linkage to a functionalized support in the first iteration, or a nucleoside bound to the substrate (i.e. the nucleoside-modified substrate) in subsequent iterations; (b) optionally, blocking unreacted hydroxyl groups on the substrate bound nucleoside (sometimes referenced as "capping"); (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The coupling can be performed by depositing drops of an activator and phosphoramidite at the specific desired feature locations for the array. Capping, oxidation and deprotection can be accomplished by treating the entire substrate ("flooding") with a layer of the appropriate reagent. The functionalized support (in the first cycle) or deprotected coupled nucleoside (in subsequent cycles) provides a substrate bound moiety with a linking group for forming the phosphite linkage with a next nucleoside to be coupled in step (a). Final deprotection of nucleoside bases can be accomplished using alkaline conditions such as ammonium hydroxide, in another flooding procedure in a known manner. Conventionally, a single pulse jet or other dispenser is assigned to deposit a single monomeric unit.

The foregoing chemistry of the synthesis of polynucleotides is described in detail, for example, in Caruthers, Science 230: 281–285, 1985; Itakura, et al., Ann. Rev. Biochem. 53: 323–356; Hunkapillar, et al., Nature 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. Nos. 4,458,066, 4,500,707, 5,153,319, 5,869,643 and European patent application, EP 0294196, and elsewhere. The phosphoramidite and phosphite triester approaches are most broadly used, but other approaches include the phosphodiester approach, the phosphotriester approach and the H-phosphonate approach. The substrates are typically functionalized to bond to the first deposited monomer. Suitable techniques for functionalizing substrates with such linking moieties are described, for example, in Southern, E. M., Maskos, U. and Elder, J. K., Genomics, 13, 1007–1017, 1992.

In the case of array fabrication, different monomers and activator may be deposited at different addresses on the substrate during any one cycle so that the different features of the completed array will have different desired biopolymer sequences. One or more intermediate further steps may be required in each cycle, such as the conventional oxidation, capping and washing steps in the case of in situ fabrication of polynucleotide arrays (again, these steps may be performed in flooding procedure).

In accordance with the method of the present invention, some or all of the above steps are performed using dedicated flow cells, i.e., a flow cell for each separate distinct step. Accordingly, for example, after addition of a nucleoside monomer, whether using an ink jet method, a photolithography method or the like, the support is placed into a chamber of a first flow cell, which is typically a housing having a reaction cavity or chamber disposed therein. The flow cell allows fluids to be passed through the chamber where the support is disposed. The support is mounted in the chamber in or on a holder. The housing usually further comprises at least one fluid inlet and at least one fluid outlet for flowing fluids into and through the chamber in which the support is mounted. In one approach, the fluid outlet may be used to vent the interior of the reaction chamber for introduction and removal of fluid by means of the inlet. On the other hand, fluids may be introduced into the reaction chamber by means of the inlet with the outlet serving as a vent and fluids may be removed from the reaction chamber by means of the outlet with the inlet serving as a vent.

The housing of the flow cell is generally constructed to permit access into the chamber therein. In one approach, the flow cell has an opening that is sealable to fluid transfer after the support is placed therein. Such seals may comprise a flexible material that is sufficiently flexible or compressible to form a fluid tight seal that can be maintained under increased pressures encountered in the use of the device. The flexible member may be, for example, rubber, flexible plastic, flexible resins, and the like and combinations thereof. In any event the flexible material should be substantially inert with respect to the fluids introduced into the device and must not interfere with the reactions that occur within the device. The flexible member is usually a gasket and may be in any shape such as, for example, circular, oval, rectangular, and the like. Preferably, the flexible member is in the form of an O-ring.

In another approach the housing of the flow cell may be conveniently constructed in two parts, which may be referred to generally as top and bottom elements. These two elements are sealably engaged during synthetic steps and are separable at other times to permit the support to be placed into and removed from the chamber of the flow cell. Generally, the top element is adapted to be moved with respect to the bottom element although other situations are contemplated herein. Movement of the top element with respect to the bottom element is achieved by means of, for example, pistons, and so forth. The movement is controlled electronically by means that are conventional in the art. In another approach a reagent chamber is formed in situ from a support and a sealing member.

The inlet of the flow cell is usually in fluid communication with an element that controls the flow of fluid into the flow cell such as, for example, a manifold, a valve, and the like or combinations thereof. This element in turn is in fluid communication with one or more fluid reagent dispensing stations. In this way different fluid reagents for one step in the synthesis of the chemical compound may be introduced sequentially into the flow cell. These reagents may be, for example, a chemical reagent that forms part of the chemical compound by addition thereto, wash fluids, oxidizing agents, reducing agents, blocking or protecting agents, unblocking (deblocking) or deprotecting agents, and so forth. Any reagent that is normally a solid reagent may be converted to a fluid reagent by dissolution in a suitable solvent, which may be a protic solvent or an aprotic solvent. The solvent may be an organic solvent such as, by way of illustration and not limitation, oxygenated organic solvents of from 1 to about 6, more usually from 1 to about 4, carbon atoms, including alcohols such as methanol, ethanol, propanol, etc., ethers such as tetrahydrofuran, ethyl ether, propyl ether, etc., acetonitrile, dimethylformamide, dimethylsulfoxide, and the like. The solvent may be an aqueous medium that is solely water or may contain a buffer, or may contain from about 0.01 to about 80 or more volume percent of a cosolvent such as an organic solvent as mentioned above.

In one embodiment the fluid dispensing stations are affixed to a base plate or main platform to which the flow cells are mounted. Any fluid dispensing station may be employed that dispenses fluids such as water, aqueous media, organic solvents and the like. The fluid dispensing station may comprises a pump for moving fluid and may also comprise a valve assembly and a manifold as well as a means for delivering predetermined quantities of fluid to the flow cell. The fluids may be dispensed by pumping from the dispensing station. In this regard any standard pumping technique for pumping fluids may be employed in the present apparatus. For example, pumping may be by means of a peristaltic pump, a pressurized fluid bed, a positive displacement pump, e.g., a syringe pump, and the like.

Upon completion of the first step in the synthesis of the chemical compound, the support is removed from the first flow cell and transferred to a second flow cell, which generally has the same or similar configuration as the first flow cell but need not. The support is transported by a transfer element such as a robotic arm, and so forth. In one embodiment a transfer robot is mounted on the main platform of the present apparatus. The transfer robot may comprise a base, an arm that is movably mounted on the base, and an element for grasping the support during transport that is attached to the arm. The element for grasping the support may be, for example, movable finger-like projections, and the like. In use, the robotic arm is activated so that the support is grasped by the above mentioned element. The arm of the robot is moved so that the support is delivered to the second flow cell, which is in the open position so that the support is delivered into the chamber thereof. The second flow cell is operated in substantially the same manner as described above for the first flow cell to carry out a second step in the synthesis of the chemical compound.

The support is transferred to additional flow cells to complete the synthesis of the chemical compound. The number of flow cells employed depends on the nature of the synthesis and the nature of the chemical compound to be synthesized. Usually, the number of flow cells is about 2 to about 20, more usually about 4 to about 12. It is within the purview of the present invention that one or more steps in the synthesis process is a repeat of an earlier step because the chemical component that is to be added to the growing molecule is the same as that in a previous step. In this instance the transfer element delivers the support to a flow cell in which the earlier repetitive step was carried out and at which the dispensing stations have the necessary reagents for conducting this step.

The amount of the reagents employed in each synthetic step in the method of the present invention is dependent on the nature of the reagents, solubility of the reagents, reactivity of the reagents, availability of the reagents, purity of the reagents, and so forth. Such amounts should be readily apparent to those skilled in the art in view of the disclosure herein. Usually, stoichiometric amounts are employed, but excess of one reagent over the other may be used where circumstances dictate. Typically, the amounts of the reagents are those necessary to achieve the overall synthesis of the chemical compound in accordance with the present invention. The time period for conducting the present method is dependent upon the specific reaction and reagents being utilized and the chemical compound being synthesized.

In accordance with the present invention a different flow cell is employed for each distinct repetitive step. Using as an example the synthesis of polynucleotides on a surface by the phosphoramidite method, the step of oxidation of phosphite to phosphate is carried out in a dedicated flow cell. Accordingly, following addition of a monomer, the support is placed in the flow cell, which is then closed to form a liquid tight seal. Various fluid dispensing stations are connected by means of a manifold and suitable valves to the inlet of the flow cell. Each of the fluid dispensing stations contains a different fluid reagent involved in performing the particular synthetic addition of monomer. Thus, in this example, one station may contain an oxidizing agent for oxidizing the phosphite to the phosphate and another station may contain a wash reagent such as acetonitrile.

The wash reagent is first allowed to pass into and out of the flow cell. Next, the oxidizing agent is allowed to pass into and out of the flow cell and the surface is again washed with the wash reagent as described above. The support is then transported from this first flow cell to a second flow cell. At this point, a deblocking reagent for removing a protecting group is allowed to pass into and out of the second flow cell. The deblocking reagent is contained in a fluid dispensing station that is in fluid communication with the second flow cell. Next, wash reagent contained in a fluid dispensing station that is in fluid communication with the second flow cell is passed into and out of the second flow cell. Following the above synthetic steps, the support is transported from the second flow cell to a station where the next monomer addition is carried out and the above repetitive synthetic steps are conducted in the first and second flow cells as discussed above.

In one embodiment of the present invention fluid exiting the outlet of the flow cell is examined to determine a condition of the fluid such as, for example, the activity of reagents in the fluid, the level of contaminants in the fluid, and so forth. An appropriate sensor is employed to determine the condition of the fluid. The nature of the sensor is dependent on the nature of the fluid reagent and impurities that may be found in the fluid reagent as a result of the reactions that have occurred in the flow cell. The sensor may be, for example, an optical sensor, and the like. The sensor determines whether the fluid reagent has exceeded a predetermined threshold. If the predetermined threshold level is exceeded, at least a portion or all of the fluid reagent is directed to a waste container. If the predetermined threshold level is not exceeded, at least a portion or all of the fluid reagent is recycled into the input stream of the flow cell or is subjected to a purification system. When the fluid reagent is recycled, it is combined with fresh fluid reagent so that the amount of recycle fluid reagent is usually about 10 to about 90%, more usually, about 25 to about 75%, and may be about 40 to about 60%, by weight of the resulting mixture.

As mentioned above, one or more purification systems may be employed in fluid communication with the outlet of the flow cell and/or with the condition sensor. The nature of the purification system is dependent on the nature of the fluid exiting the flow cell. More particularly, the fluid exiting the flow cell may exhibit a certain condition. For example, the fluid may contain certain impurities or contaminants from the reactions that have occurred in the flow cell. Such impurities may be, for example, ionic or non-ionic, and so forth. The fluid exiting the flow cell may contain reacted or spent reagent or reaction by-products and/or unreacted reagent. The purification systems may comprise a chromatographic column for separation of impurities or spent reagent. The column usually comprises a separation medium such as, for example, an ion exchange medium, and the like. It is within the purview of the present invention to employ one or more purification systems depending on the nature and condition of the fluid reagent exiting the flow cell.

Fluid exiting the purification system may be directed to a holding element where an aliquot of the fluid is examined. The holding element may be any suitable receptacle. An appropriate sensor is employed to determine the condition of the fluid reagent. The fluid is examined by the sensor and, based on a determination of the condition of the liquid by the sensor, at least a portion or all of the liquid is directed to the inlet of the flow cell to be combined with fresh fluid reagent or is sent to waste. The sensor may be the same as or similar to a sensor mentioned above.

Figure 1:
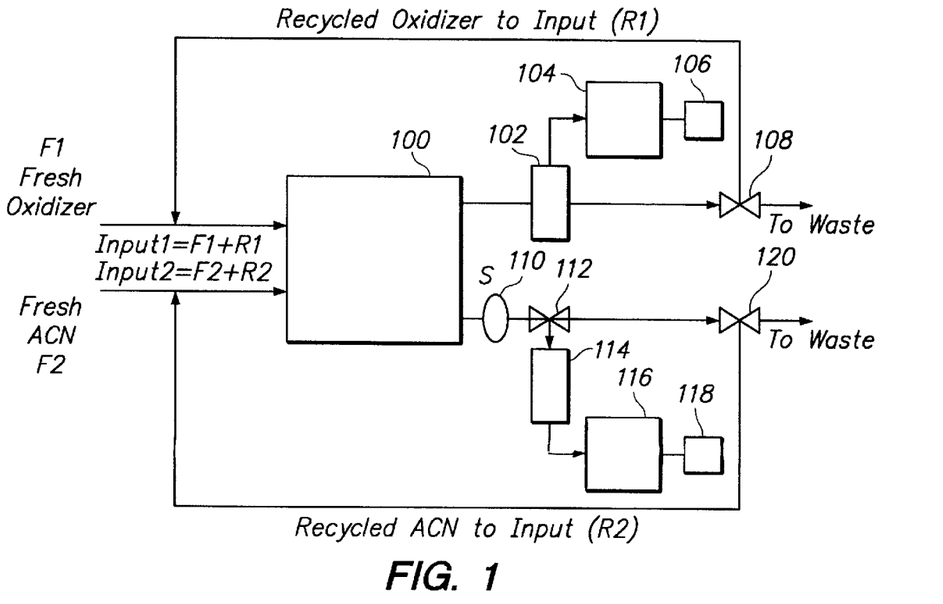
FIG. 1 is a flow chart depicting one aspect of a method in accordance with the present invention.

The following discussion is by way of illustration and not limitation. Referring to FIG. 1 a flow cell 100 is depicted in which one step in the synthesis of an array of polynucleotides is carried out. As mentioned above, one such step involves the oxidation of a phosphite group to a phosphate group. In accordance with the present invention a dedicated flow cell is employed. A support on which the array is synthesized is placed in flow cell 100 and a fluid oxidizer reagent F1 is introduced into flow cell 100. After an appropriate incubation period, the fluid reagent is caused to exit flow cell 100 through an outlet and is directed to a dehydration column 102. The dehydration column may be any suitable column known in the art for dehydration. A sample of the fluid oxidizer reagent in the dehydration column is directed to an anhydrous chamber 104, which is in fluid communication with dehydration column 102. The fluid oxidizer reagent is allowed to equilibrate for a predetermined period of time, which is dependent of the nature of the fluid reagent and is usually determined empirically. A humidity sensor 106 examines the equilibrated fluid oxidizer reagent. The humidity sensor may be any suitable sensor as known in the art. A predetermined threshold of oxidizer activity is set and the output from sensor 106 is compared to this threshold value. Depending on the determination by sensor 106, the fluid oxidizer reagent is either sent to waste or recycled (designated R1 in FIG. 1) for combination with fresh oxidizer reagent F1 and introduction into the flow cell. A suitable valve 108, such as, e.g., a three-way valve, is employed and is controlled by appropriate electronics to react to the input from the humidity sensor. As a result of the input from the sensor, valve 108 opens to waste or to the recycling line.

Referring to again to FIG. 1, a fluid wash reagent F2, namely, acetonitrile in this example, is introduced into flow cell 100 following the oxidization with the oxidizer reagent. After an appropriate incubation period, the fluid wash reagent is caused to exit the flow cell through an outlet and is directed through a sensor 110 that determines the level of contamination of the fluid wash reagent. The nature of sensor 110 is dependent on the nature of the fluid wash reagent and on the nature of the contaminants that may be present in the fluid wash reagent. Contamination sensor 110 may be, for example, an optical sensor, and the like. A predetermined threshold level of contamination is set above which the fluid wash reagent is sent to waste. Depending on the contamination sensor reading, the fluid wash reagent is sent to waste or to a dehydration column 114. An appropriate valve 112 is employed that is actuated by the contamination sensor reading. A sample of the fluid wash reagent in dehydration column 114 is directed to an anhydrous chamber 116, which is in fluid communication with dehydration column 114. The fluid wash reagent is allowed to equilibrate in anhydrous chamber 116 for a predetermined period of time, which is dependent of the nature of the fluid wash reagent. A humidity sensor 118 examines the equilibrated fluid wash reagent. A predetermined threshold of contamination is set and the output from sensor 118 is compared to this threshold. Depending on the determination by sensor 118, the fluid wash reagent is either sent to waste or recycled (designated R2 in FIG. 1) to be combined with fresh wash reagent F2 for introduction into the flow cell. A suitable valve 120, such as, e.g., a three-way valve, is employed and is controlled by appropriate electronics to react to the input from humidity sensor 118. As a result of the input from sensor 118, valve 120 opens to waste or to the recycling line.

Figure 2:
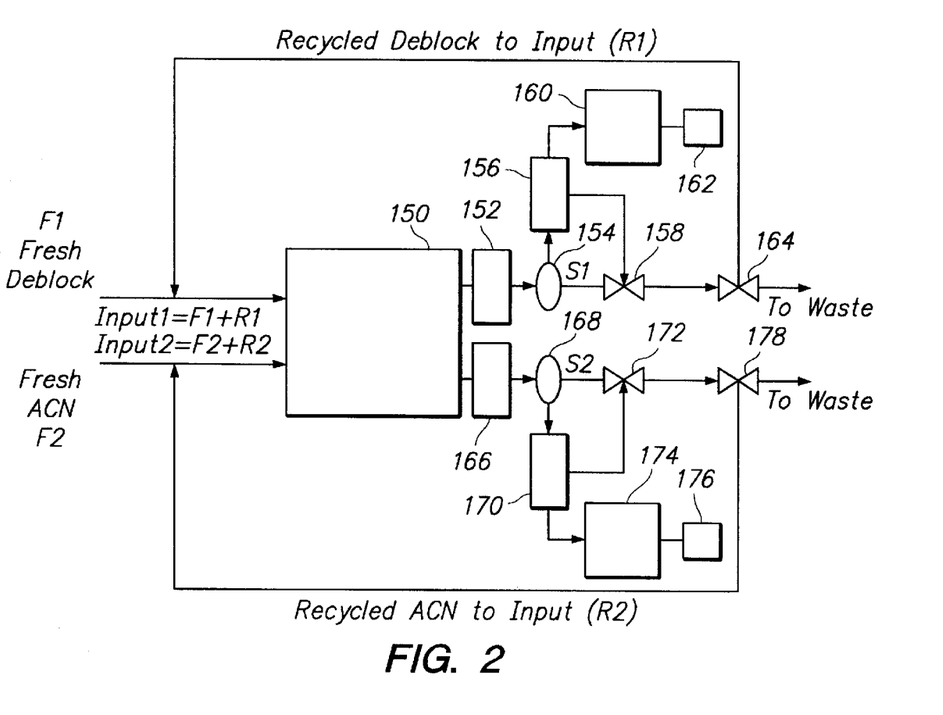
FIG. 2 is a flow chart depicting another aspect of a method in accordance with the present invention.

Another embodiment of the above is depicted in FIG. 2. A flow cell 150 is depicted in which another step in the synthesis of an array of polynucleotides is carried out. As mentioned above, one such step involves the removal of protecting groups or deblocking the reactive sites on the surface of the support. In accordance with the present invention a dedicated flow cell 150 is employed for this synthetic step. A support on which the array is synthesized is placed in flow cell 150 and a fluid deblocking reagent F1' such as, for example, dilute mineral acid, and the like is introduced into the flow cell. After an appropriate incubation period, the fluid deblocking reagent is caused to exit the flow cell through an outlet and is directed to an ion exchange column 152. The nature of ion exchange column 152 is dependent on the nature of the ionic contaminants, i.e., whether the contaminants are cationic or anionic, and so forth. Ionic contaminants such as trityl cation, and the like are removed from the fluid deblocking reagent in ion exchange column 152. The material in the ion exchange column will be suggested to those skilled in the art in view of the disclosure herein.

The extent of contaminant removal is determined by an appropriate contamination sensor 154 such as an optical sensor, and the like. A predetermined threshold level of contamination is set above which the fluid deblocking reagent is sent to waste. Depending on the reading by contamination sensor 154, the fluid deblocking reagent is sent to waste or to a dehydration column 156. An appropriate valve 158 is employed that is actuated by the contamination sensor reading. A sample of the fluid deblocking reagent in dehydration column 156 is directed to an anhydrous chamber 160, which is in fluid communication with dehydration column 156. The fluid deblocking reagent is allowed to equilibrate for a predetermined period of time, which is dependent of the nature of the fluid deblocking reagent. A humidity sensor 162 examines the equilibrated fluid deblocking reagent. A predetermined threshold of contamination is set and the output from sensor 162 is compared to this threshold value. Depending on the determination by the sensor, the fluid deblocking reagent is either sent to waste or recycled (designated R1' in FIG. 2) for combination with fresh deblocking reagent F1' and introduction into flow cell 150. A suitable valve 164, such as, e.g., a three-way valve, is employed and is controlled by appropriate electronics to react to the input from humidity sensor 162. As a result of the input from sensor 162, valve 164 opens to waste or to the recycling line.

Referring again to again to FIG. 2, a fluid wash reagent F2', namely, acetonitrile, is introduced into flow cell 150 following the deblocking with the deblocking reagent. After an appropriate incubation period, the fluid deblocking reagent is caused to exit flow cell 150 through an outlet and is directed to an ion exchange column 166. The nature of ion exchange column 166 is dependent on the nature of the ionic contaminants as discussed above. Ionic contaminants such as trityl cation, and the like are removed from the fluid wash reagent in ion exchange column 166.

The extent of contaminant removal is determined by an appropriate contamination sensor 168 such as an optical sensor, and the like. A predetermined threshold level of contamination is set above which the fluid wash reagent is sent to waste. Depending on the reading from contamination sensor 168, the fluid wash reagent is sent to waste or to a dehydration column 170. An appropriate valve 172 is employed that is actuated by the reading from contamination sensor 168. A sample of the fluid wash reagent in dehydration column 170 is directed to an anhydrous chamber 174, which is in fluid communication with dehydration column 170. The fluid wash reagent is allowed to equilibrate for a predetermined period of time, which is dependent of the nature of the fluid wash reagent and the nature of any contaminants. A humidity sensor 176 examines the equilibrated fluid wash reagent. A predetermined threshold of contamination is set and the output from sensor 176 is compared to this threshold value. Depending on the determination by sensor 176, the fluid wash reagent is either sent to waste or recycled (designated R2' in FIG. 2) for combination with fresh wash reagent F2' and introduction into flow cell 150. A suitable valve 178, such as, e.g., a three-way valve, is employed and is controlled by appropriate electronics to react to the input from humidity sensor 176. As a result of the input from sensor 176, valve 178 opens to waste or to the recycling line.

Another embodiment of the present invention is an apparatus for synthesizing an array of biopolymers on the surface of a support. The apparatus comprises a platform and a plurality of flow cells mounted on the platform. The flow cells comprise a chamber, a holder for the support, at least one inlet and an outlet, wherein each of the inlets is in fluid communication with a manifold. The outlet is in controlled fluid communication with one or more purification systems, holding chambers and sensors. One or more fluid dispensing stations are mounted on the platform and are in fluid communication with one or more of the plurality of flow cells by means of the manifolds. A station for monomer addition to the surface of the support is mounted on the platform. The apparatus also comprises a mechanism for moving a support to and from the station for monomer addition and a flow cell and from one flow cell to another flow cell. The mechanism may be, for example, a robotic arm, and so forth.

In one embodiment of a mechanism for moving a support from one flow cell to another flow cell, the support is delivered into the opening in the wall of the flow cell housing by engagement with a holding element, which usually comprises a main arm and an end portion that contacts and engages a surface of the support. In one embodiment the holding element is in the form of a fork that is vacuum activated. Other embodiments of the holding element include, for example, grasping elements such as movable finger-like projections, and the like. The holding element is usually part of a transfer robot that comprises a robotic arm that is capable or transferring the support from various positions where steps in the synthesis of the chemical compound are performed such as between several flow devices in accordance with the present invention. In one embodiment a transfer robot is mounted on the main platform. The transfer robot may comprise a base, an arm that is movably mounted on the base, and an element for holding the support during transport that is attached to the arm.

Also included is a controller for controlling the movement of the mechanism. The apparatus may further comprise a purification system in fluid communication with the outlet. In addition, the apparatus may comprise a holding chamber in fluid communication with the purification system and a sensor in fluid communication with holding chamber.

Figure 3:
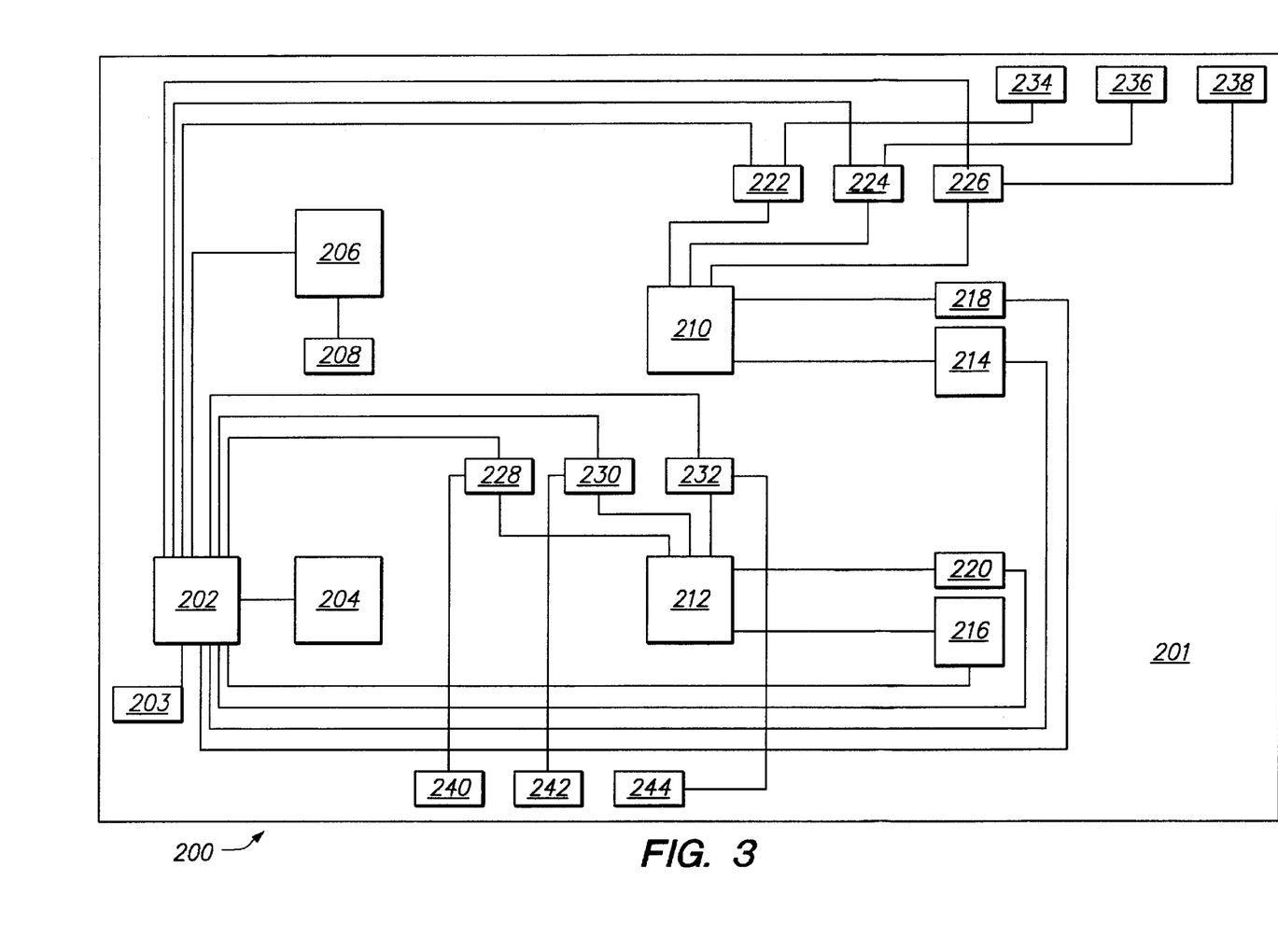
FIG. 3 is a schematic diagram depicting an embodiment of an apparatus in accordance with the present invention.

One embodiment of an apparatus in accordance with the present invention is depicted in FIG. 3 in schematic form. Apparatus 200 comprises platform 201 on which the components of the apparatus are mounted. Apparatus 200 comprises main computer 202, with which various components of the apparatus are in communication. Video display 203 is in communication with computer 202. Apparatus 200 further comprises print chamber 204, which is controlled by main computer 202. The nature of print chamber 204 depends on the nature of the printing technique employed to add monomers to a growing polymer chain. Such printing techniques include, by way of illustration and not limitation, inkjet printing, and so forth. Transfer robot 206 is also controlled by main computer 202 and comprises a robot arm 208 that moves a support to be printed from print chamber 204 to either first flow cell 210 or second flow cell 212. In one embodiment robot arm 208 introduces a support into print chamber 204 horizontally for printing on a surface of the support and introduces the support into a flow cell vertically. First flow cell 210 is in communication with program logic controller 214, which is controlled by main computer 202, and second flow cell 212 is in communication with program logic controller 216, which is also controlled by main computer 202. First flow cell 210 is in communication with flow sensor and level indicator 218, which is controlled by main computer 202, and second flow cell 212 is in communication with flow sensor and level indicator 220, which is also controlled by main computer 202. First flow cell 210 is in fluid communication with manifolds 222, 224 and 226, each of which is controlled by main computer 202 and each of which is in fluid communication with a source of fluid reagents, namely, 234, 236 and 238, respectively. Second flow cell 212 is in fluid communication with manifolds 228, 230 and 2232, each of which is controlled by main computer 202 and each of which is in fluid communication with a source of fluid reagents, namely, 240, 242 and 244, respectively. In one embodiment each of flow cells 214 and 216 is adapted for recycling fluid reagents as shown in FIGS. 1 and 2.

The apparatus of the invention further comprise appropriate electrical and mechanical architecture and electrical connections, wiring and devices such as timers, clocks, and so forth for operating the various elements of the apparatus. Such architecture is familiar to those skilled in the art and will not be discussed in more detail herein.

The methods in accordance with the present invention may be carried out under computer control, that is, with the aid of a computer. For example, an IBM® compatible personal computer (PC) may be utilized. The computer is driven by software specific to the methods described herein. A preferred computer hardware capable of assisting in the operation of the methods in accordance with the present invention involves a system with at least the following specifications: Pentium® processor or better with a clock speed of at least 100 MHz, at least 32 megabytes of random access memory (RAM) and at least 80 megabytes of virtual memory, running under either the Windows 95 or Windows NT 4.0 operating system (or successor thereof).

Software that may be used to carry out the methods may be, for example, Microsoft Excel or Microsoft Access, suitably extended via user-written functions and templates, and linked when necessary to stand-alone programs that perform homology searches or sequence manipulations. Examples of software or computer programs used in assisting in conducting the present methods may be written, preferably, in Visual BASIC, FORTRAN and C++, as exemplified below in the Examples. It should be understood that the above computer information and the software used herein are by way of example and not limitation. The present methods may be adapted to other computers and software. Other languages that may be used include, for example, PASCAL, PERL or assembly language.

A computer program may be utilized to carry out the above method steps. The computer program provides for (i) placing a support into a chamber of a first flow device, (ii) introducing a fluid reagent for conducting a reaction step into the reagent chamber, (iii) removing the fluid reagent from the reagent chamber, (iv) removing the support from the housing chamber, (v) placing the support into a chamber of a flow device, (vi) introducing a fluid reagent for conducting a reaction step into the reagent chamber, (vii) removing the fluid reagent from the reagent chamber, (viii) removing the support from the housing chamber. The computer program may provide for moving the support to and from a station for monomer addition at a predetermined point in the aforementioned method.

The computer program may also provide for determining a condition of fluid exiting the chamber of the device and based on the determination directing at least a portion of the fluid back to the flow cell or to a waste container for the fluid. In this regard the computer program may provide for operation of sensors for determining the condition of a fluid and for operation of valves to direct the flow of the fluid. The computer program may provide for directing the fluid to a purification system either prior to or after determining its condition.

Another aspect of the present invention is a computer program product comprising a computer readable storage medium having a computer program stored thereon which, when loaded into a computer, performs the aforementioned method.

Following receipt by a user of an array made by an apparatus or method of the present invention, it will typically be exposed to a sample (for example, a fluorescent-labeled polynucleotide or protein containing sample) and the array is then read. Reading of the array may be accomplished by illuminating the array and reading the location and intensity of resulting fluorescence at each feature of the array. For example, a scanner may be used for this purpose where the scanner may be similar to, for example, the GENEARRAY scanner available from Agilent Technologies, Palo Alto, Calif. Other suitable apparatus and methods are described in U.S. patent applications Ser. No.09/846,125 "Reading Multi-Featured Arrays" by Dorsel, et al.; and Ser. No. 09/430,214 "Interrogating Multi-Featured Arrays" by Dorsel, et al. The relevant portions of these references are incorporated herein by reference. However, arrays may be read by methods or apparatus other than the foregoing, with other reading methods including other optical techniques (for example, detecting chemiluminescent or electroluminescent labels) or electrical techniques (where each feature is provided with an electrode to detect hybridization at that feature in a manner disclosed in U.S. Pat. No. 6,221,583 and elsewhere). Results from the reading may be raw results (such as fluorescence intensity readings for each feature in one or more color channels) or may be processed results such as obtained by rejecting a reading for a feature that is below a predetermined threshold and/or forming conclusions based on the pattern read from the array (such as whether or not a particular target sequence may have been present in the sample). The results of the reading (processed or not) may be forwarded (such as by communication) to a remote location if desired, and received there for further use (such as further processing).

When one item is indicated as being "remote" from another, this is referenced that the two items are at least in different buildings, and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method for synthesizing an array of chemical compounds on the surface of a support, said method comprising:
   (a) contacting a surface of said support with a fluid reagent for synthesizing said chemical compounds,
   (b) mounting said support in a chamber of a flow cell and subjecting said surface to one step of said synthesis and
   (c) mounting said support in a chamber of another flow cell and subjecting said surface to another step of said synthesis wherein (a)–(c) are repeated until said array of chemical compounds is synthesized on said surface and wherein each of said flow cells comprises a housing with a chamber and an inlet and an outlet for introduction and removal of fluids in the chamber in which the support is mounted wherein said support is selected from the group consisting of a strip, a plate or a flat glass.

2. A method according to claim 1 further comprising mounting said support after step (c) of said synthesis into a chamber of another flow cell and subjecting said surface to another step of said synthesis.

3. A method according to claim 1 wherein said synthesis comprises "n" number of steps including (b) and (C) and said method comprises independently mounting a support into a chamber of one of "n" number of flow cells and subjecting said surface to a different step of said synthesis in each of said flow cells.

4. A method according to claim 1 wherein reagents for step (b) of said synthesis are in fluid communication with said how cell of step (b) and reagents for step (c) of said synthesis are in fluid communication with said flow cell of step (C) and wherein the fluid communication of the flow cell of step (b) is separate from the fluid communication of the flow cell of step (c).

5. A method according to claim 1 wherein at least one of said steps of said synthesis comprises washing said surface.

6. A method according to claim 1 wherein said chemical compounds are polymers.

7. A method according to claim 6 wherein said polymers are biopolymers.

8. A method according to claim 1 wherein said flow cells comprise a holder for said support.

9. A method according to claim 1 wherein said flow cells comprise at least one inlet and an outlet.

10. A method according to claim 9 wherein a condition of fluid exiting said outlet is determined and based on said determination at least a portion of said fluid is directed to said inlet or to a waste container for said fluid.

11. A method according to claim 9 wherein fluid exiting said outlet is subjected to purification and a condition of said fluid is determined and based on said determination at least a portion of said fluid is directed to said inlet or to a waste container for said fluid.

12. A method according to claim 9 wherein a wash solution and a reagent for said synthesis are independently directed to said inlet.

13. A method for synthesizing an array of biopolymers on the surface of a support wherein said synthesis comprises a plurality of monomer additions, said method comprising:

(a) depositing droplets of monomer addition reagents on a surface of said support, (b) placing said support into a chamber of a flow cell and subjecting said surface to a step of said synthesis that is subsequent to a monomer addition and (c) placing said support into a chamber of another flow cell and subjecting said surface to another step of said synthesis that is subsequent to step (b) wherein said steps are repeated until said array of biopolymers is synthesized on said surface and wherein each of said flow cells comprises a housing with a chamber and an inlet and an outlet for introduction and removal of fluids in the chamber in which the support is placed and wherein said flow cell of (b) is dedicated to said step (b) and said flow cell of (c) is dedicated to step (c).

14. A method according to claim 13 wherein one of said steps (b) and (c) comprises a wash.

15. A method according to claim 13 wherein said biopolymers are polynucleotides.

16. A method according to claim 13 wherein step (b) comprises subjecting said surface to an oxidizing agent.

17. A method according to claim 13 wherein step (c) comprises subjecting said surface to an agent for removing a protecting group.

18. A method according to claim 13 wherein said flow cells comprise at least one inlet and an outlet and a holder for said support.

19. A method according to claim 18 wherein fluid exiting said flow cell is subjected to purification and a condition of said fluid is determined and based on said determination at least a portion of said fluid is directed to said flow cell or to a waste container for said fluid.

20. A method according to claim 18 wherein a wash solution and a reagent for said synthesis are independently directed to said inlet.

21. A method according to claim 13 wherein a condition of fluid exiting said flow cell is determined and based on said determination at least a portion of said fluid is directed to said flow cell or to a waste container for said fluid.

22. A method according to claim 21 wherein said fluid is an organic solvent.

23. A method according to claim 13 wherein said biopolymers are peptides.

24. A method according to claim 13 wherein said biopolymers are synthesized on said surface in multiple arrays and said support is subsequently diced into individual arrays of biopolymers on a support.

25. A method according to claim 13 wherein reagents for said first step of said synthesis are in separate fluid communication with said first flow cell and reagents for said second step of said synthesis are in separate fluid communication with said second flow cell.

26. A method according to claim 13 further comprising exposing the array to a sample and reading the array.

27. A method according to claim 26 comprising forwarding data comprising a result obtained from a reading of the array.

28. A method according to claim 27 wherein the data is transmitted to a remote location.

29. A method according to claim 26 comprising receiving data comprising a result of an interrogation obtained by the reading of the array.

* * * * *